Patented May 4, 1954

2,677,640

UNITED STATES PATENT OFFICE 2,677,640

THERAPEUTIC SOLUTIONS

Joseph F. Weidenheimer, Pearl River, and Lawrence Ritter, Valley Cottage, N. Y., assignors to American Cyanamid Company, New York, N. Y., a corporation of Maine No Drawing. Application November 10, 1951, Serial No. 255,874

5 Claims. (Cl. 167—53.1)

This invention relates to new compositions of matter of therapeutic value and to methods of compounding and using them.

In the U. S. patent issued to Emanuel Waletzky and Harry W. Marson, 2,531,756 issued November 28, 1950, it is disclosed that certain heterocyclic organic compounds are useful as therapeutic agents for the control of enterohepatitis, a disease which is particularly serious in turkeys and which is more generally referred to as blackhead disease. These compounds, which are effective in either preventing or curing the disease, may be administered in various ways; by individual dosage of the bird, by incorporation in the animal's food or by dissolving them in drinking water. Generally, it is not practical to administer individual dosages of the drug to the birds. Incorporation of the drug in their solid food has the disadvantage that considerable care must be exercised in mixing so that there is a uniform concentration of the drug throughout the food. This method of administration has the further disadvantage in that the birds are often very particular in their choice of food and may eat only some of the several varieties offered to them and where their diet contains more than one item of food, for example, grain and mash, they may either ingest more or less of the drug than is necessary for effective therapy. In addition to these disadvantages, very sick birds often refuse to eat although they will generally continue to drink.

Because of the disadvantages of administering the drug in the solid elements of sustenance, it is often desirable that the drug be made available in the birds' drinking water. Unfortunately, the drugs described in the Waletzky et al. patent are difficultly soluble in water. For example, 2-amino-5-nitrothiazole, one of the best of the therapeutic agents described in the patent, has a water solubility at ordinary temperatures to the extent of only about 0.1% by weight. Although this is a therapeutically effective level, and solutions containing this amount of the drug are satisfactory for the protection of the bird, it is not easy to prepare solutions of this strength. Excessive time is required to dissolve satisfactory concentrations of the drug in the drinking water, and as a result, solutions may be offered to the birds which are not of adequate concentration. It is desired, therefore, that the drugs be made available in a form which is concentrated enough for easy shipping and handling and yet instantly soluble in drinking water.

We have found that the therapeutic compounds described in the Waletzky et al. patent may be readily dissolved in mono lower alkyl ethers of alkylene glycols in good concentrations and that the solutions are instantly dispersable in water at any desired therapeutic strength. To illustrate, the preferred compound 2-amino-5-nitrothiazole is readily dissolved in the monoethyl ether of ethylene glycol to a concentration as high as 12%. This solution can be poured into drinking water to provide therapeutic solutions within the desired ranges without any difficulty. Such concentrated stock solution is stable and the drug will not precipitate therefrom even when stored in cold rooms for prolonged periods of time.

Other lower alkyl ethers of alkylene glycols that may be used to prepare water soluble concentrated solutions of the therapeutically effective compounds of the Waletzky et al. patent include dipropylene glycol methyl ether, tripropylene glycol ethyl ether, ethylene glycol methyl ether and the like. Of course, mixtures of these mono alkyl ethers may also be employed, particularly the commercially available products which include, for example, mixtures of the mono, di and tri propylene glycol methyl ethers. We prefer that these solutions contain at least 5% by weight of the drug and may contain as much as 12.5% by weight to obtain clear solutions. When using higher concentrations of the drug, it may occur as a suspension. Suspensions may result when the product is stored under unusually cold conditions, but the product is readily dispersed in water, notwithstanding.

To illustrate the invention in greater detail, the following specific examples are given.

Example 1

50 grams of crude 2-amino-5-nitrothiazole was dissolved in 450 ml. of dipropylene glycol methyl ether with heating on a steam bath. The resulting solution was treated with adsorbent charcoal, filtered, and made up to total volume of 500 ml. This solution could be diluted by pouring into water, with stirring, to prepare a therapeutic solution containing 0.1% by weight of the drug. This diluted solution is acceptable to turkeys and may be consumed by them ad libitum without toxic effects to prevent or cure enterohepatitis.

Example 2

25 grams of 2-amino-5-nitrothiazole, purified by recrystallization from alcohol, was dissolved in 200 ml. of hot tripropylene glycol methyl ether. The solution was then made up to total volume of 250 ml. with the latter solvent. This solution was likewise diluted with water to provide solutions which could be consumed by birds to obtain effective amounts of the drug.

Example 3

50 grams of crude 2-amino-5-nitrothiazole was dissolved in 450 ml. of ethylene glycol mono ethyl ether by heating on a steam bath. The solution was treated with activated charcoal, filtered, and made up to volume of 500 ml. This solution, as well as others, was stable on storage and could be diluted with water to any desired concentration.

Example 4

20 grams of crude 2-amino-5-nitrothiazole were suspended in 100 ml. of dipropylene glycol mono methyl ether. This suspension showed the desired property of wetability, thereby allowing therapeutic concentrations of the drug to be readily dissolved in water.

For some therapeutic purposes, it may be desirable to administer the concentrated solutions prepared as described above to the birds without diluting in water by a dropper or in capsules.

2-amino-5-nitropyrimidine, 2-amino-5-nitropyridine, 2-acetylamino-5-nitropyridine and other similar compounds such as are specifically described in the Waletzky et al. patent may be dissolved in mono alkyl ethers of alkylene glycols in the manner described above and likewise may be dissolved in water to desired concentrations for the effective control of enterohepatitis.

What we claim is:

1. A composition of matter soluble in water to provide an aqueous solution effective in the control of enterohepatitis which comprises a dispersion of a lower mono alkyl ether of an alkylene glycol of the group consisting of the methyl and ethyl mono ethers of ethylene glycol, mono propylene glycol, di-propylene glycol and tri-propylene glycol containing an amount within the range of 5% to 20% by weight of a member of the group consisting of 2-amino-5-nitropyrimidine, 2-acetylamino-5-nitropyrimidine, 2-amino-5-nitropyridine, 2-acetylamino-5-nitropyridine, 2-amino-4-methyl-5-nitropyridine, 2-amino-5-nitrothiazole, 2-acetylamino-5-nitrothiazole, and 2-amino-4-methyl-5-nitrothiazole.

2. A composition of matter soluble in water to provide an aqueous solution effective in the control of enterohepatitis which comprises a dispersion of a lower mono alkyl ether of an alkylene glycol of the group consisting of the methyl and ethyl mono ethers of ethylene glycol, mono propylene glycol, di-propylene glycol and tri-propylene glycol containing an amount within the range of 5% to 20% by weight of 2-amino-5-nitrothiazole.

3. A composition of matter soluble in water to provide an aqueous solution effective in the control of enterohepatitis which comprises a solution of dipropylene glycol mono methyl ether containing 5 to 12.5% by weight of 2-amino-5-nitrothiazole.

4. A composition of matter soluble in water to provide an aqueous solution effective in the control of enterohepatitis which comprises a solution of tripropylene glycol mono methyl ether containing 5% to 12.5% by weight of 2-amino-5-nitrothiazole.

5. A composition of matter soluble in water to provide an aqueous solution effective in the control of enterohepatitis which comprises a solution of ethylene glycol mono ethyl ether containing 5% to 12.5% by weight of 2-amino-5-nitrothiazole.

References Cited in the file of this patent

UNITED STATES PATENTS

| Number | Name | Date |
|---|---|---|
| 2,033,921 | Christiansen | Mar. 17, 1936 |
| 2,161,407 | Christiansen | June 6, 1939 |
| 2,531,756 | Waletzky | Nov. 28, 1950 |

OTHER REFERENCES

U. S. Dispensatory, 24th ed. (1947, page 1597).

Brown: Quarterly Journal of Pharmacy and Pharmacology (1935), pages 390 to 397.

Dumez: Journal of the Americal Pharmaceutical Ass'n, vol. 28, July 1939, pages 416 to 421.